United States Patent
Kiwan et al.

(10) Patent No.: US 11,073,098 B2
(45) Date of Patent: Jul. 27, 2021

(54) METHOD AND SYSTEM FOR DETECTING CYLINDER MISFIRE VIA CORRECTED CRANKSHAFT ACCELERATION

(71) Applicant: Ford Global Technologies, LLC, Dearborn, MI (US)

(72) Inventors: Rani Kiwan, Ann Arbor, MI (US); Imtiaz Ali, Lathrup Village, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 16/435,285

(22) Filed: Jun. 7, 2019

(65) Prior Publication Data
US 2020/0386180 A1    Dec. 10, 2020

(51) Int. Cl.
| | |
|---|---|
| *F02D 41/14* | (2006.01) |
| *F02D 17/02* | (2006.01) |
| *F02P 5/15* | (2006.01) |
| *F02P 9/00* | (2006.01) |

(52) U.S. Cl.
CPC ......... *F02D 41/1498* (2013.01); *F02D 17/02* (2013.01); *F02P 5/15* (2013.01); *F02P 9/002* (2013.01)

(58) Field of Classification Search
CPC ........ F02D 41/1498; F02D 41/10; F02P 5/15; F02P 5/06; F02P 9/002
See application file for complete search history.

(56) References Cited

U.S. PATENT DOCUMENTS

| | | | |
|---|---|---|---|
| 5,506,778 A * | 4/1996 | Matsumoto | ......... F02D 41/1498 701/111 |
| 5,610,328 A * | 3/1997 | Magan | ................... G01M 15/11 73/114.05 |
| 5,699,252 A | 12/1997 | Citron et al. | |
| 5,774,823 A | 6/1998 | James et al. | |
| 5,808,186 A * | 9/1998 | Matsumoto | ......... F02D 41/1498 73/114.03 |
| 8,176,896 B2 | 5/2012 | Verdejo et al. | |
| 2010/0037860 A1* | 2/2010 | Morita | ................ F02D 41/1459 123/406.53 |

\* cited by examiner

*Primary Examiner* — Phutthiwat Wongwian
*Assistant Examiner* — Diem T Tran
(74) *Attorney, Agent, or Firm* — Geoffrey Brumbaugh; McCoy Russell LLP

(57) ABSTRACT

Methods and systems are provided for operating a variable displacement engine that includes a misfire detection system. The misfire detection system corrects engine crankshaft acceleration according to cylinder firing patterns so that misfire detection may be improved. The corrected engine crankshaft accelerations may be compared to threshold crankshaft levels to determine the presence or absence of cylinder misfire.

15 Claims, 7 Drawing Sheets

METHOD AND SYSTEM FOR DETECTING CYLINDER MISFIRE VIA CORRECTED CRANKSHAFT ACCELERATION

FIELD

The present application relates to methods and systems for detecting and responding to misfiring cylinders of a variable displacement engine (VDE).

BACKGROUND/SUMMARY

From time to time an internal combustion engine may misfire due to low spark energy, a lean air-fuel mixture, or engine component degradation. The misfires may increase engine emissions and degrade vehicle drivability. Therefore, it may be desirable to detect and compensate for engine misfires. One way of determining an engine misfire is to monitor engine crankshaft acceleration. If the engine crankshaft does not accelerate as expected, it may be determined that the engine is misfiring. However, if the engine is a variable displacement engine that changes the cylinders that fire from one engine cycle to the next engine cycle, the crankshaft acceleration for a particular cylinder may vary from engine cycle to engine cycle so that cylinder misfire may not be reliably detected by simply comparing engine acceleration to a static engine acceleration threshold. Therefore, it may be desirable to provide a way of reliably detecting misfire based on engine crankshaft acceleration for a variable displacement engine (VDE).

The inventors herein have recognized that engine crankshaft acceleration may be influenced by VDE modes and have developed a method for operating an engine, comprising: operating a variable displacement engine; correcting a crankshaft acceleration via a controller responsive to at least two of an average crankshaft acceleration in a portion of a compression stroke of a cylinder, an average crankshaft acceleration in a first portion of an expansion stroke of the cylinder, and an average crankshaft acceleration in a second portion of the expansion stroke of the cylinder; and adjusting engine operation responsive to a misfire detected via the controller, the misfire detected via the corrected crankshaft acceleration.

By correcting engine crankshaft acceleration according to at least two of an average crankshaft acceleration in a portion of a compression stroke of a cylinder, an average crankshaft acceleration in a first portion of an expansion stroke of the cylinder, and an average crankshaft acceleration in a second portion of the expansion stroke of the cylinder, it may be possible to provide the technical result of accurately determining the presence or absence of cylinder misfire. Once misfire is detected, mitigating actions may be taken to reduce the possibility of additional cylinder misfires. The engine crankshaft acceleration correction may also include compensation for the engine's firing fraction (e.g., a ratio of engine cylinders that fire in one or more engine cycles to the total number of cylinder compression strokes in the one or more engine cycles).

The present description may provide several advantages. In particular, the approach may improve estimates of engine crankshaft acceleration. Further, the approach may improve the detection of cylinder misfire. In addition, the approach may provide compensation for engine misfire so that a possibility of a cylinder misfire may be reduced, thereby improving vehicle emissions and drivability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
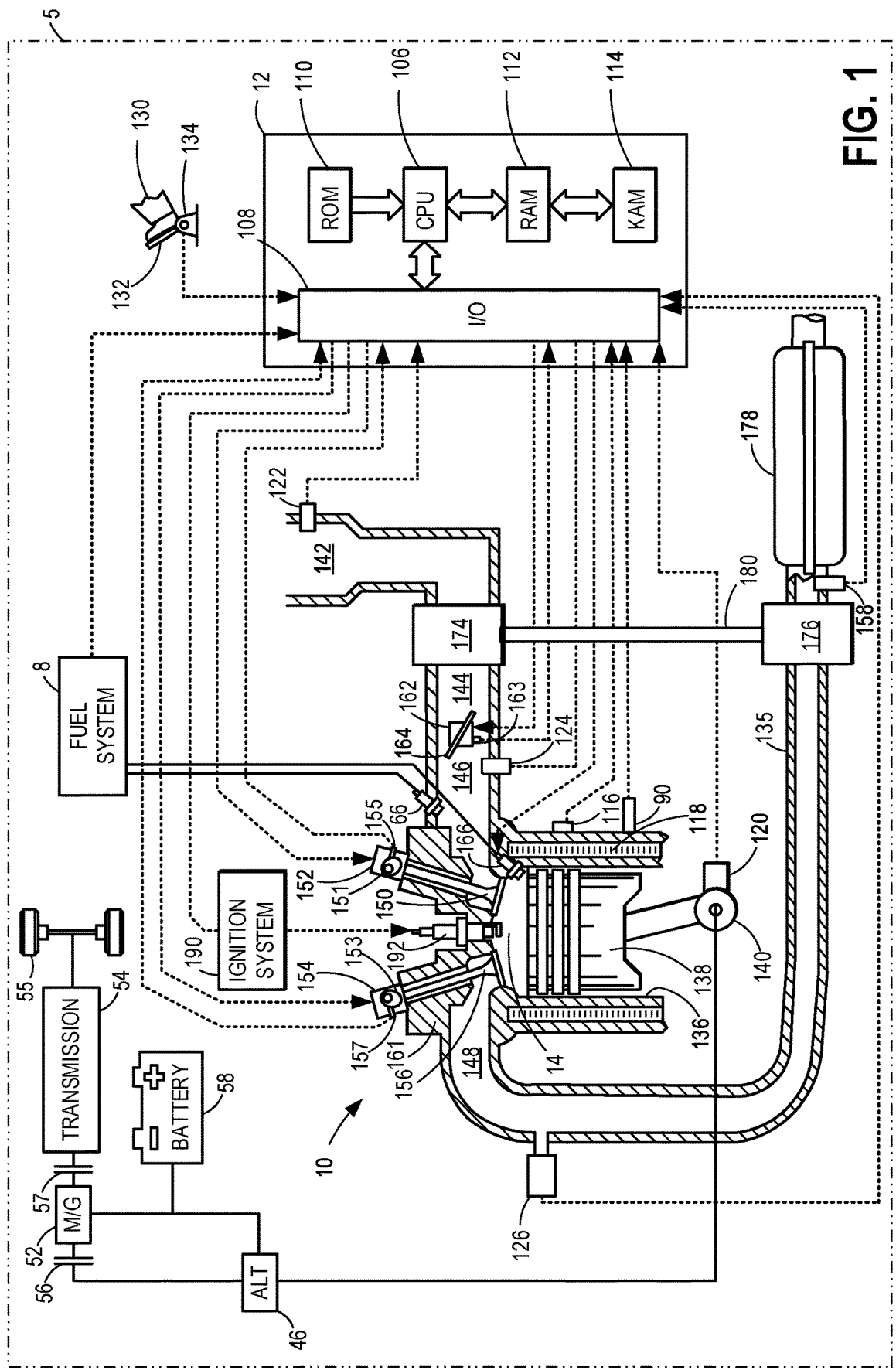
FIG. 1 shows a schematic depiction of an engine system of a vehicle.
Figure 2:
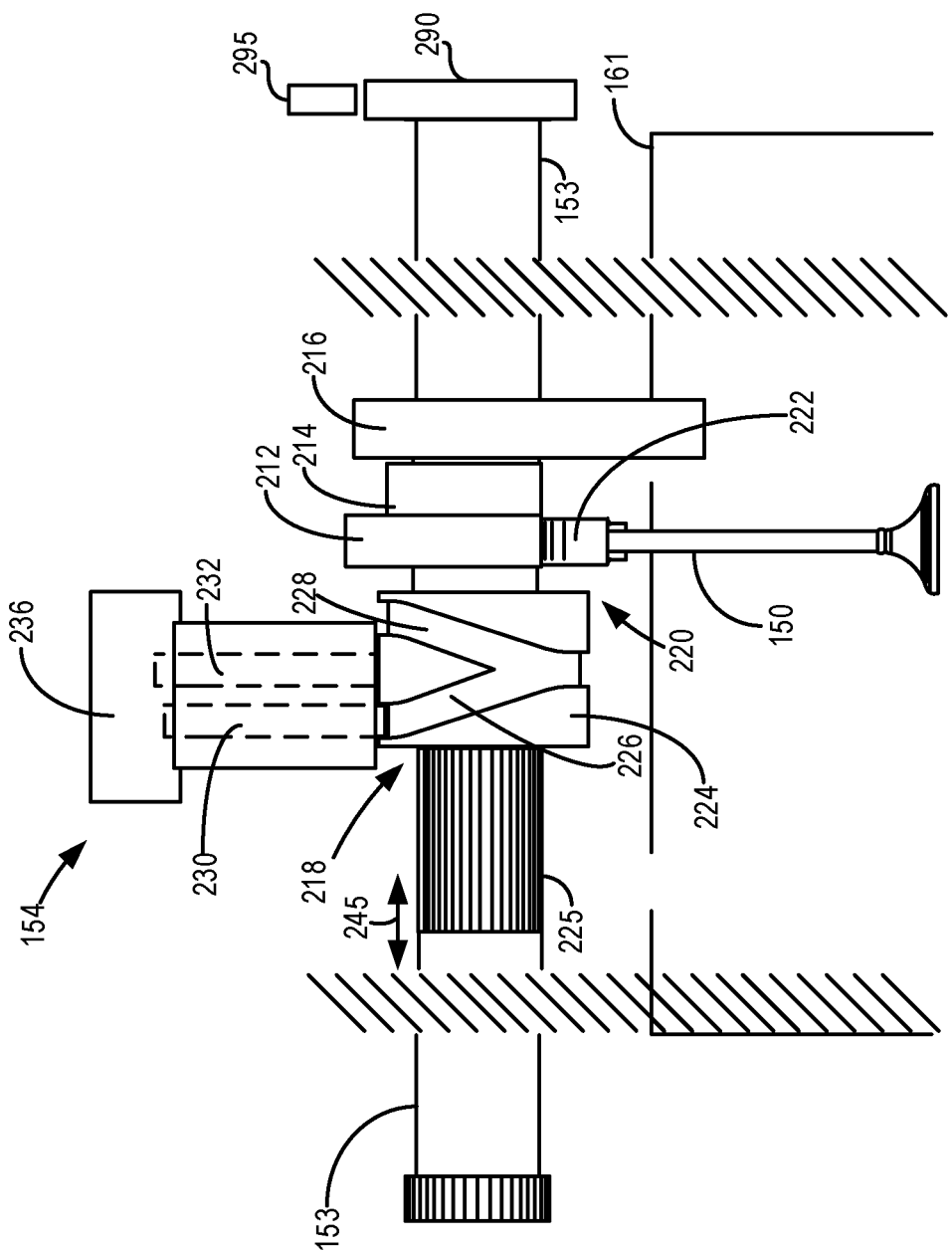
FIG. 2 shows an example of a poppet valve deactivating system for operating the engine of FIG. 1 as a variable displacement engine.
Figure 3A:
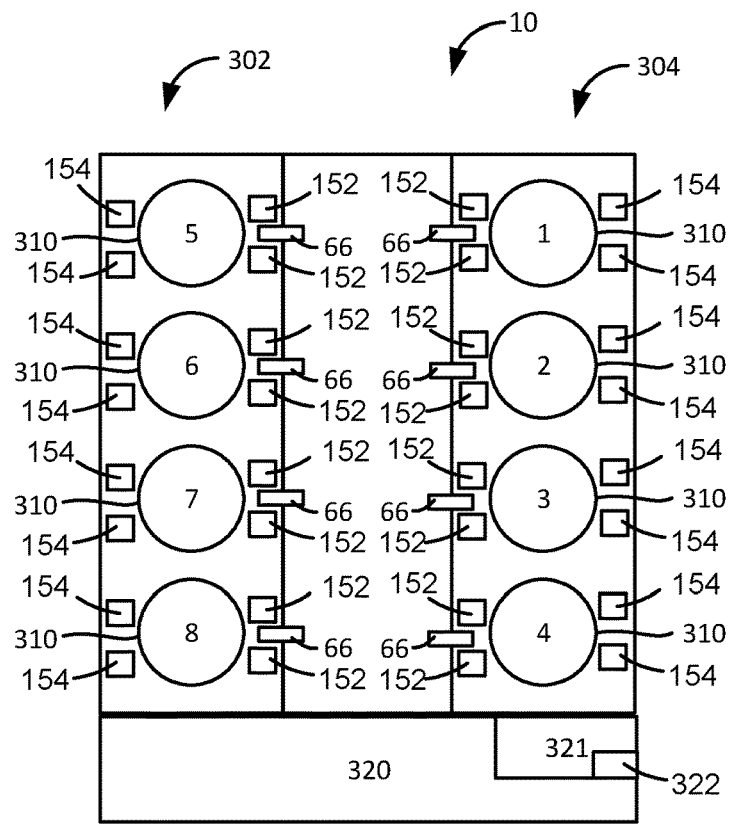
FIGS. 3A and 3B show example engine configurations for a variable displacement engine.
Figure 3B:
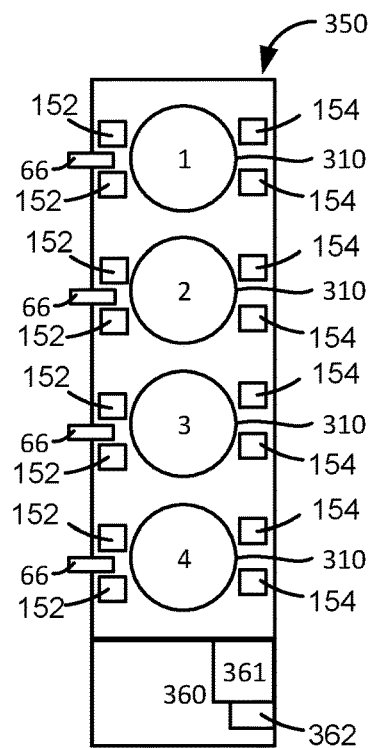
Figure 6:
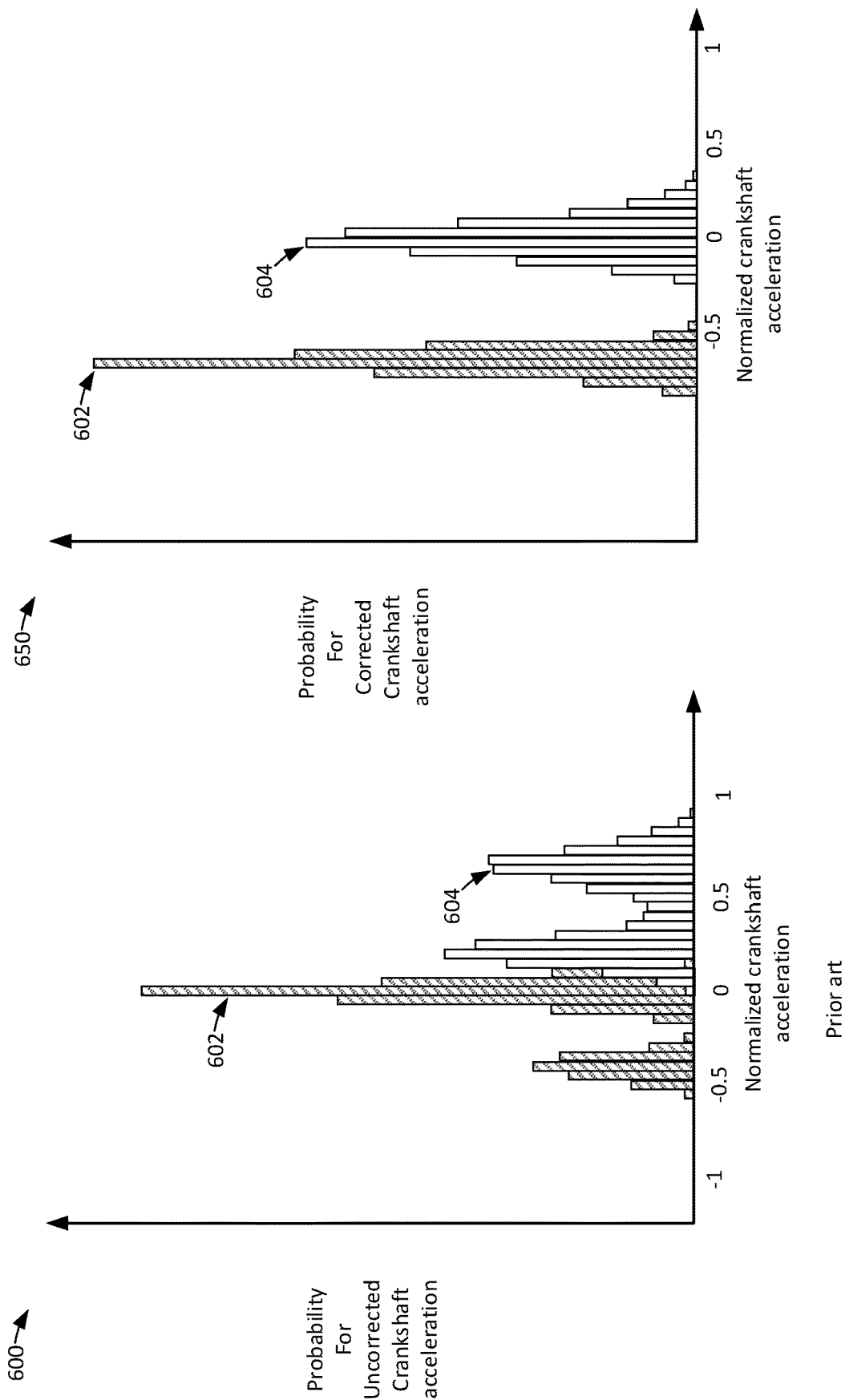
FIG. 6 shows a histogram of uncorrected engine crankshaft acceleration when an engine is operating in a cylinder deactivation mode and a histogram of corrected engine crankshaft acceleration when the engine is operating in the cylinder deactivation mode.
Figure 7:
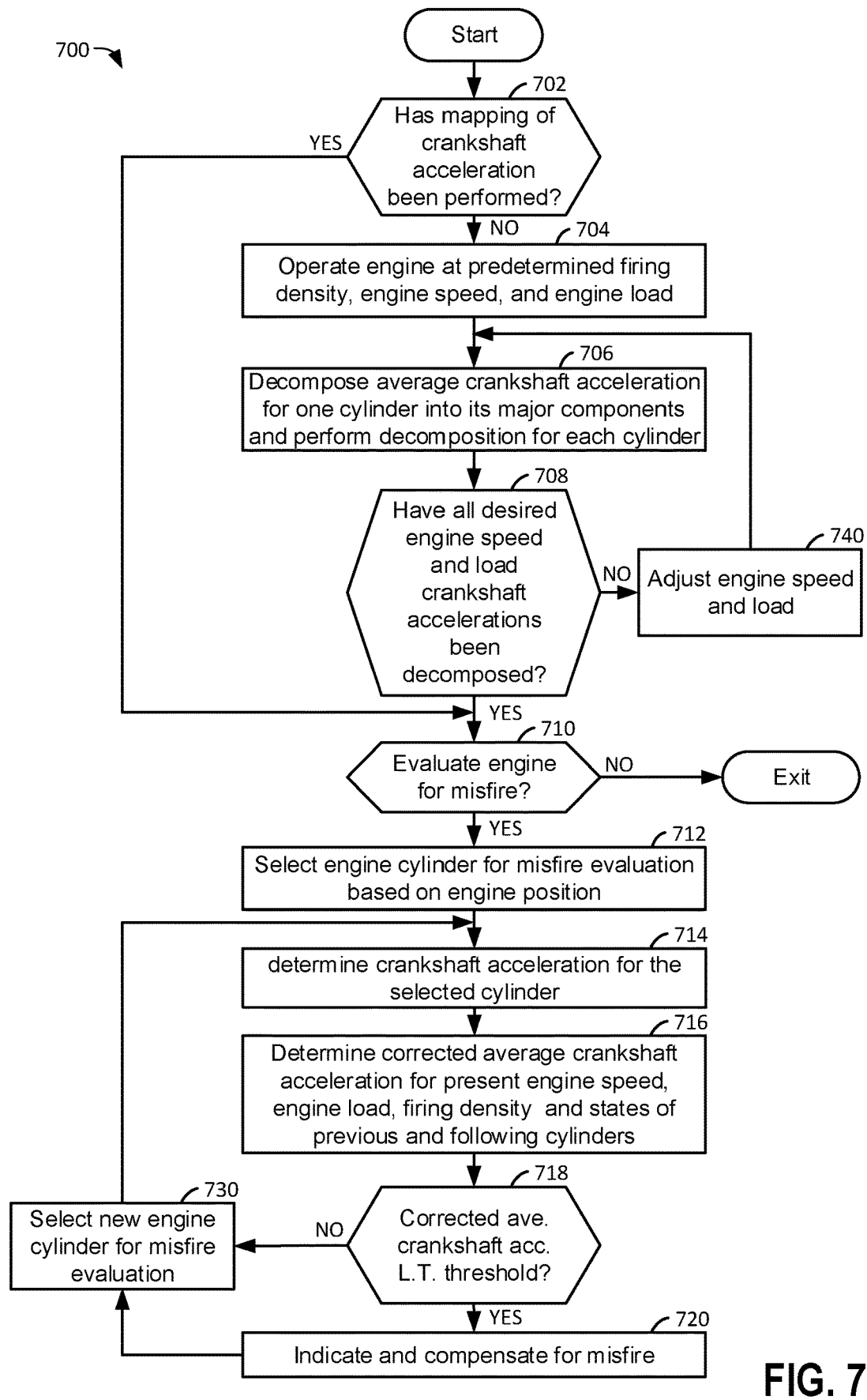
FIG. 7 shows an example method for detecting cylinder misfire and compensating for cylinder misfire via corrected engine acceleration.

The following description relates to systems and methods for operating a variable displacement engine (VDE) and controlling and detecting cylinder misfire of the VDE engine. The engine may be of the type that is shown in FIG. 1. The engine may include valve operators as shown in FIG. 2 that may be selectively deactivated. The engine may be configured as shown in FIGS. 3A and 3B. Engine crankshaft acceleration may follow the trajectories shown in the plots of FIGS. 4 and 5. Uncorrected and corrected engine acceleration histograms are shown in FIG. 6 to illustrate the improved detectability of cylinder misfire when crankshaft acceleration is corrected according to the method described herein. FIG. 7 shows a method for providing compensation for and improving detection of cylinder misfire.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively. Intake valve 150 and exhaust valve 156 reciprocate within cylinder head 161.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock. An amount of energy supplied to spark plug 192 may be increased or decreased via adjusting an amount of time an ignition coil or electric energy device receives charge.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., knock) via knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

FIG. 2 shows an example cylinder valve actuator 154 for application in engine 10 shown in FIG. 1. Cylinder valve actuator 154 adjusts a lift and/or valve opening duration of a cylinder exhaust valve 156 in response to engine operating conditions. Cylinder valve actuator 154 may provide zero valve lift for one or more engine cycles to deactivate cylinder exhaust valves 156. Exhaust camshaft 153 is shown positioned above a cylinder head 161 of an engine cylinder bank. Exhaust valve 150 is configured to open and close an exhaust port in a cylinder, such as the cylinder shown in FIG. 1. For example, exhaust valve 150 may be actuatable between an open position allowing gas exchange into or out of a cylinder and a closed position substantially blocking gas exchange into or out of the cylinder. It should be understood that though only one valve is shown in FIG. 2; however, engine 10 shown in FIG. 1 may include any number of cylinder valves. Further, a cylinder valve actuator similar to cylinder valve actuator 154 may be applied to engine intake valves. In addition, engine 10 of FIG. 1 may include any number of cylinders with associated valves and a variety of different cylinder and valve configurations may be used, e.g., V-6, I-4, I-6, V-12, opposed 4, and other engine types.

One or more cam towers or camshaft mounting regions may be coupled to cylinder head 161 to support exhaust camshaft 153. For example, cam tower 216 is shown coupled to cylinder head 161 adjacent to exhaust valve 150. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Exhaust valve 150 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., exhaust valve 150, may be operated in different lift modes based on engine operating conditions.

Exhaust camshaft 153 may include a plurality of cam lobes configured to control the opening and closing of the exhaust valves. For example, FIG. 2 shows a first cam lobe 212 and a second cam lobe 214 positioned above exhaust valve 150. The cams lobes may have different shapes and sizes to form lift profiles used to adjust an amount and timing of a lifting of exhaust valve 150 while exhaust camshaft 153 rotates. For example, exhaust cam 212 may be a full lift cam lobe and cam 214 may be a zero lift cam lobe. Though, FIG. 2 shows two lift profiles associated with first cam 212 and second cam 214, it should be understood that any number of lift profile cams may be present, e.g., three different cam lobes.

Exhaust camshaft 153 includes a mechanism 218 coupled to the camshaft above the exhaust valve 150 for adjusting an amount of valve lift for that exhaust valve 150 and/or for deactivating the exhaust valve 150 by changing a location of cam lobes along the camshaft relative to exhaust valve 150. For example, the cam lobes 212 and 214 may be slideably attached to the camshaft so that they can slide along the camshaft in an axial direction on a per-cylinder basis. For example, a plurality of cam lobes, e.g., cam lobes 212 and 214, positioned above each cylinder valve, e.g., exhaust valve 150, may be slid across the camshaft in directions indicated by arrow 245 to change a cam lobe profile coupled to the valve follower, e.g., follower 220 coupled to exhaust valve 150, to change the exhaust valve opening and closing durations and lift amounts. The valve cam follower 220 may include a roller finger follower (RFF) 222 which engages with a cam lobe positioned above valve 202. For example, in FIG. 2, roller 222 is shown engaging with full lift cam lobe 212.

Additional follower elements not shown in FIG. 2 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 is splined to exhaust camshaft 53 and is coupled to the cam lobes 212 and 214. Camshaft position relative to the engine crankshaft is determined via rotation sensing camshaft position sensor 295 and exhaust camshaft position indicator 290. Exhaust camshaft 53 may be coupled to a cam phaser that is used to vary the valve timing with respect to crankshaft position. By engaging a pin, e.g., one of the pins 230 or 232, into a grooved hub in the outer sleeve, the axial position of the sleeve can be repositioned so that a different cam lobe engages the cam follower coupled to exhaust valve 150 in order to change the lift of the exhaust valve 150. For example, sleeve 224 may include one or more displacing grooves, e.g., grooves 226 and 228, which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for exhaust valve 150. Sleeve 224 is shown in a first position while pin 232 shifts sleeve 224 to the left side of FIG. 2. Sleeve 224 follows spline 225 in an axial direction along exhaust camshaft 150 when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while exhaust camshaft 150 rotates, thereby positioning cam lobe 212 above exhaust valve 150 and changing the valve lift profile. In order to switch back to cam lobe 214, second pin 232 may be deployed into groove 228 which will shift outer sleeve 224 away from cam tower 216 to position cam lobe 214 above exhaust valve 150. In some examples, multiple outer sleeves containing lobes may be splined to exhaust camshaft 153. For example, outer sleeves may be coupled to cam lobes above every valve in engine 10 or a select number of cam lobes above the valves.

Actuator pins 230 and 232 are included in a cam lobe switching actuator 154 which adjusts the positions of the pins 230 and 232 in order to switch cam lobes positioned above a valve 202. Exhaust cam lobe switching actuator 154 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized, e.g., via a current supplied thereto from the control system, a force is applied to both pins to deploy both pins toward the sleeve.

Referring now to FIG. 3A, an example multi-cylinder engine that includes two cylinder banks is shown. The engine includes cylinders and associated components as shown in FIG. 1. Engine 10 includes eight cylinders each of which are labeled 310. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. For example, cylinders 2, 3, 5, and 8 (e.g., a fixed pattern of deactivated cylinders) may be deactivated during an engine cycle (e.g., two revolutions for a four stroke engine) and may be deactivated for a plurality of engine cycles while engine speed and load are constant or very slightly. During a different engine cycle, a second fixed pattern of cylinders 1, 4, 6, and 7 may be deactivated. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. Each cylinder includes variable intake valve operators 152 and variable exhaust valve operators 154. An engine cylinder may be deactivated by its variable intake valve operators 152 and variable exhaust valve operators 154 holding intake and exhaust valves of the cylinder closed during an entire cycle of the cylinder. Fuel flow to the cylinder ceases when a cylinder is deactivated. An engine cylinder may be activated by its variable intake valve operators 152 and variable exhaust valve operators 154 opening and closing intake and exhaust valves of the cylinder during a cycle of the cylinder. Fuel is supplied to a cylinder that is activated, but valves of a cylinder may open and close during a cylinder cycle without supplying fuel to the cylinder during deceleration fuel shut-off. Engine 10 includes a first cylinder bank 304, which includes four cylinders 1, 2, 3, and 4. Engine 10 also includes a second cylinder bank 302, which includes four cylinders 5, 6, 7, and 8. Cylinders of each bank may be active or deactivated during a cycle of the engine.

Engine 10 is also shown coupled to transmission 320. Transmission 320 may be a fixed ratio transmission, dual clutch transmission, constant velocity transmission, or other known type of transmission. Sensor 322 may provide an indication of the position of shifter 321. For example, sensor 322 may indicate that transmission is engaged in park, neutral, reverse, or drive. The output of sensor 322 may be input to controller 12 of FIG. 1.

Referring now to FIG. 3B, an example multi-cylinder engine that includes one cylinder bank is shown. The engine includes cylinders and associated components as shown in FIG. 1. Engine 10 includes four cylinders 310. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 350, which includes four cylinders 1-4. Cylinders of the single bank may be active or deactivated during a cycle of the engine. Each cylinder includes variable intake valve operators 152 and variable exhaust valve operators 154. An engine cylinder may be deactivated by its variable intake valve operators 152 and variable exhaust valve operators 154 holding intake and exhaust valves of the cylinder closed during a cycle of the cylinder. Fuel flow is ceased to a cylinder that is deactivated. An engine cylinder may be activated by its variable intake valve operators 152 and variable exhaust valve operators 154 opening and closing intake and exhaust valves of the cylinder during a cycle of the cylinder. Fuel is supplied to a cylinder that is activated, but valves of a cylinder may open and close during a cylinder cycle without supplying fuel to the cylinder during deceleration fuel shut-off.

Engine 10 is also shown coupled to transmission 360. Transmission 360 may be a fixed ratio transmission, dual clutch transmission, constant velocity transmission, or other known type of transmission. Sensor 362 may provide an indication of the position of shifter 361. For example, sensor 362 may indicate that transmission is engaged in park, neutral, reverse, or drive. The output of sensor 362 may be input to controller 12 of FIG. 1.

Thus, the system of FIGS. 1-3B provides for a system for operating an engine, comprising: a variable displacement engine; and a controller including executable instructions stored in non-transitory memory to operate the variable displacement engine and adjust engine operation responsive to a corrected crankshaft acceleration that is based on at least two of an average crankshaft acceleration in a portion of a compression stroke of a cylinder, an average crankshaft acceleration in a first portion of an expansion stroke of the cylinder, and an average crankshaft acceleration in a second portion of the expansion stroke of the cylinder. The system further comprises additional instructions to operate the variable displacement engine with fewer than all of its cylinders during an engine cycle while determining the corrected crankshaft acceleration. The system includes where the average crankshaft acceleration in the portion of the compression stroke of the cylinder, the average crankshaft acceleration in the first portion of the expansion stroke of the cylinder, and the average crankshaft acceleration in the second portion of the expansion stroke of the cylinder are stored in controller memory. The system includes where adjusting engine operation includes adjusting engine spark timing. The system includes where adjusting engine operation includes adjusting an engine air-fuel ratio.

Figure 4:
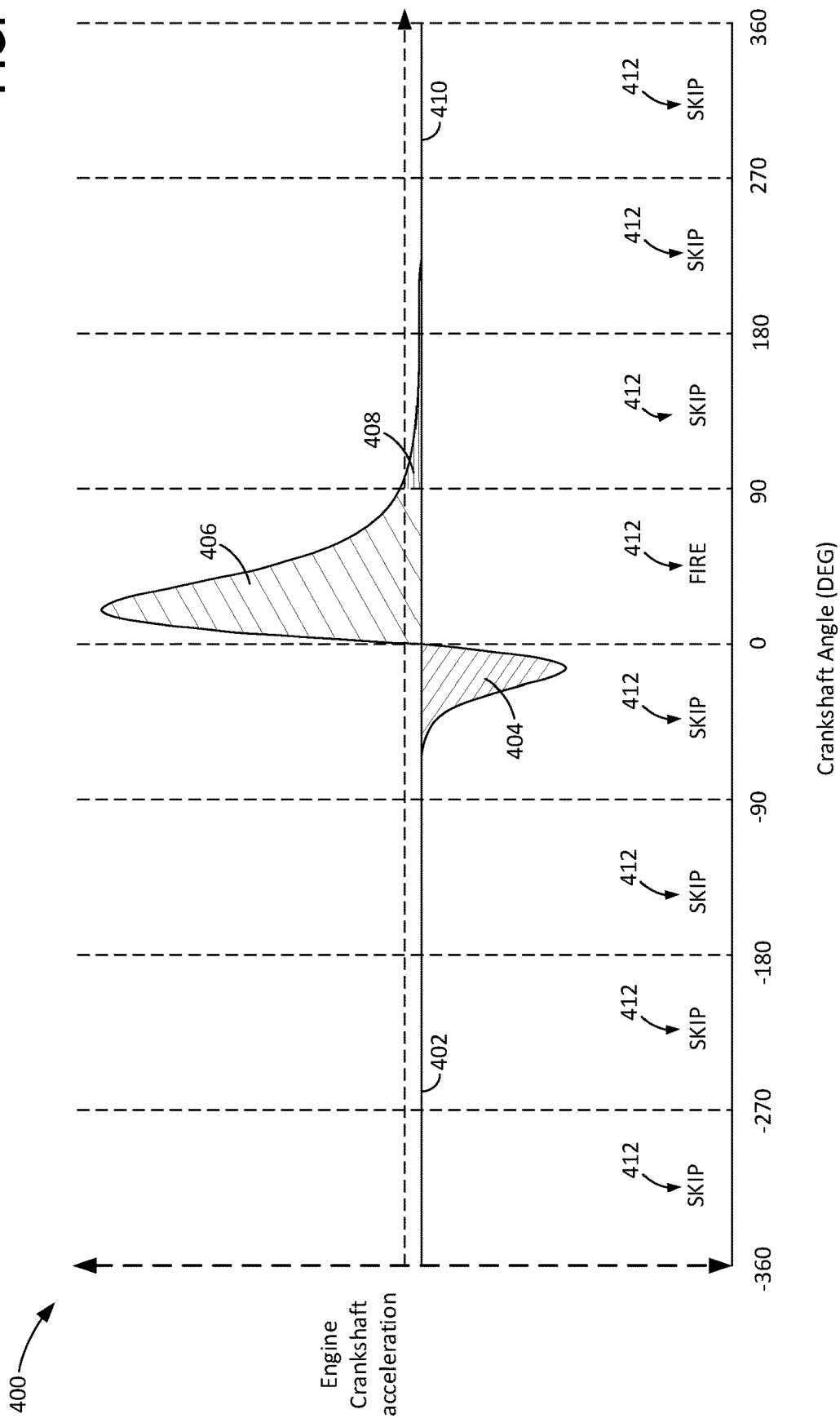
FIG. 4 shows a plot of engine crankshaft acceleration for a single cylinder of an engine.

Referring now to FIG. 4, a plot of engine crankshaft acceleration for a single cylinder of an engine is shown. Plot 400 is for an eight cylinder engine and engine crankshaft acceleration for one of the eight engine's cylinders is shown for one engine cycle.

The vertical axis represents engine crankshaft acceleration and engine crankshaft acceleration is positive (e.g., increasing engine speed) when trace 402 is above the horizontal axis (e.g., dashed line). The magnitude of positive engine crankshaft acceleration increases in the direction of the arrow that points upward. The engine crankshaft acceleration is negative (e.g., decreasing engine speed) when trace 402 is below the horizontal axis. The magnitude of negative engine crankshaft acceleration increases in the direction of the arrow that points downward. Trace 402 represents the engine crankshaft acceleration.

The horizontal axis represents engine crankshaft position and zero crankshaft degrees is top dead center compression stroke for the single engine cylinder. The horizontal axis is divided into ninety crankshaft degree intervals, which divide each cylinder stroke into a first portion and a second portion. Each portion of each cylinder stroke includes a label 412 to indicate crankshaft angles where the cylinder of the engine undergoing its first half of the expansion stroke fires or does not fire. A "fire" label indicates a crankshaft interval where combustion is initiated in a cylinder via generating a spark so as to combust an air-fuel mixture in the cylinder during the labeled crankshaft interval and a crankshaft interval labeled "skip" is a crankshaft interval where a cylinder does not generate a spark to combust an air-fuel mixture during the labeled crankshaft interval.

In this example, the engine crankshaft acceleration is divided into four accelerations. The engine acceleration that is due to transmission, friction, and accessory loads is indicated at the engine crankshaft level that is indicated at 410. The engine crankshaft acceleration for the cylinder during the second half of the compression stroke of the cylinder is indicated at shaded area 404. The engine crankshaft acceleration for the cylinder during the first half of the expansion stroke of the cylinder is indicated at shaded area 406. The engine crankshaft acceleration for the cylinder during the second half of the expansion stroke of the cylinder is indicated at shaded area 408. These may be referred to as the major engine crankshaft acceleration components that are due to the single cylinder. The engine crankshaft accelerations for accessory loads, engine crankshaft accelerations during the second half of the compression stroke of the cylinder, and engine crankshaft accelerations during the second half of the expansion stroke of the cylinder may decelerate the engine crankshaft. In another example, the engine crankshaft accelerations during the second half of the expansion stroke of the cylinder may accelerate the engine crankshaft depending on factors including cylinder load, accessory loads and spark timing. The engine crankshaft accelerations during the first half of the expansion stroke may accelerate the engine crankshaft.

Thus, it may be observed that the engine crankshaft acceleration during the second half of the cylinder's compression stroke may operate to reduce engine crankshaft acceleration that may occur due to combustion in a cylinder that is earlier in an order of combustion (not shown in this example). Further, the engine crankshaft acceleration that occurs during the first half of the cylinder's expansion stroke may operate to accelerate the crankshaft to a greater extent. Further still, the engine crankshaft acceleration that occurs during the second half of the cylinder's expansion stroke may operate to decelerate the engine's crankshaft while torque generated due to combustion in a first half of the expansion stroke of a cylinder that is next in an order of combustion accelerates the engine crankshaft during the next cylinder's expansion stroke. Accordingly, engine crankshaft acceleration attributable to a single cylinder may affect engine crankshaft acceleration in combination with engine crankshaft acceleration that is attributable to another cylinder (e.g., a cylinder in an order of combustion that is immediately before or immediately after the cylinder). For example, if the engine's firing order is 1-3-7-2-6-5-4-8, and cylinder 7 is on its first half of its expansion stroke, then engine crankshaft acceleration during the first half of cylinder number 7's expansion stroke may be a function of engine crankshaft acceleration due to torque generated via cylinder number 3 in the second half of cylinder number 3's expansion stroke, engine crankshaft acceleration due to engine load torque, and engine crankshaft acceleration due to torque generated via cylinder number 2 in the second half of cylinder number 2's compression stroke. In this way, engine crankshaft acceleration during a particular crankshaft interval may be influenced by cylinders that do not fire and cylinders that do fire. In other words, a misfire of a preceding cylinder, and a pressure in a following cylinder (e.g., a cylinder next in the order of combustion) during the following cylinder's second half of its compression stroke may change a contribution to engine crankshaft acceleration during the first half of an expansion stroke of another cylinder.

Figure 5:
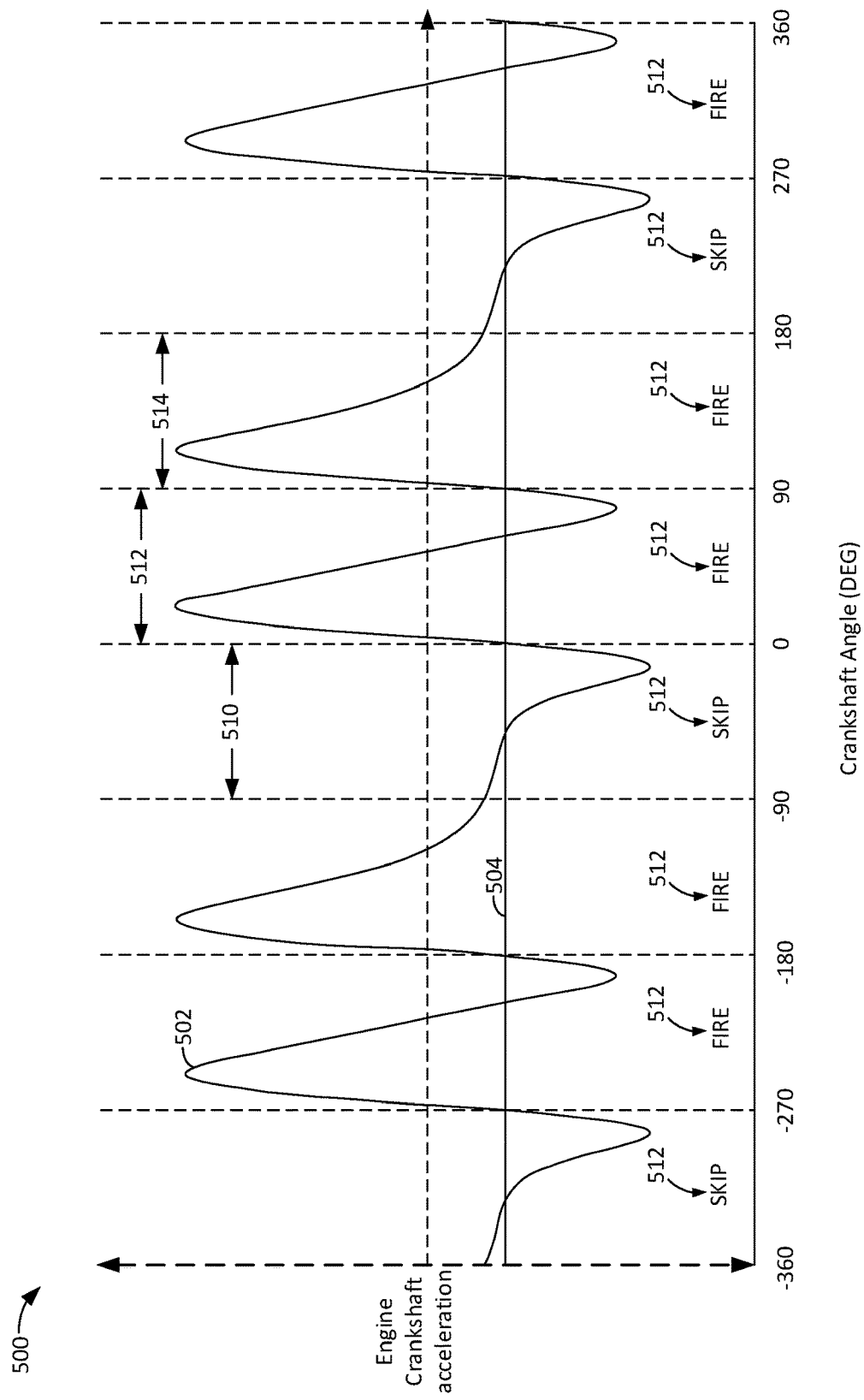
FIG. 5 shows a plot of engine crankshaft acceleration for an engine that is operating with a ⅔ firing fraction.

Referring now to FIG. 5, a plot of engine crankshaft acceleration for an engine operating with a ⅔ firing fraction of cylinders is shown. Plot 500 is for an eight cylinder four stroke engine and engine crankshaft acceleration for cylinders participating in the ⅔ firing fraction are shown for one engine cycle.

The vertical axis represents engine crankshaft acceleration and engine crankshaft acceleration is positive (e.g., increasing engine speed) when trace 502 is above the horizontal axis (e.g., dashed line). The magnitude of positive engine crankshaft acceleration increases in the direction of the arrow that points upward. The engine crankshaft acceleration is negative (e.g., decreasing engine speed) when trace 502 is below the horizontal axis. The magnitude of negative engine crankshaft acceleration increases in the direction of the arrow that points downward. Trace 502 represents the engine crankshaft acceleration and 504 represents the level of acceleration due to engine load.

The horizontal axis represents engine crankshaft position and zero crankshaft degrees is top dead center compression stroke for one particular engine cylinder. The horizontal axis is divided into ninety crankshaft degree intervals, which divide each cylinder stroke into a first portion and a second portion. Each portion of each cylinder stroke includes a label 512 to indicate crankshaft angles where the cylinder of the engine undergoing its first half of the expansion stroke fires or does not fire. A "fire" label indicates a crankshaft interval where a cylinder combusts an air-fuel mixture in the cylinder during the labeled crankshaft interval and a crankshaft interval labeled "skip" is a crankshaft interval where a cylinder does not combust an air-fuel mixture during the labeled crankshaft interval.

The crankshaft interval between crankshaft angles −90 and 0, which is identified as crankshaft angular interval 510 is a crankshaft interval where combustion in one engine cylinder undergoing its first half of the expansion stroke is purposefully skipped (e.g., the cylinder is purposefully deactivated). During this crankshaft interval, there is no crankshaft acceleration that is due to crankshaft acceleration during the first half of the expansion stroke of the cylinder where combustion is skipped. Therefore, misfire detection for the cylinder where combustion is skipped and that is on its first half of its expansion stroke is not performed.

The crankshaft interval between crankshaft angles 0 and 90, which is identified as crankshaft angular interval 512 is a crankshaft interval where combustion in one engine cylinder undergoing its first half of the expansion stroke is requested or initiated via a spark plug. During this crankshaft interval, there may be crankshaft acceleration that is due to crankshaft acceleration during the first half of the expansion stroke of the cylinder in which combustion is requested or initiated. Therefore, misfire detection for the cylinder that is on its first half of its expansion stroke is performed. The average engine crankshaft acceleration during crankshaft interval 512 includes a crankshaft acceleration due to engine loads, crankshaft acceleration that is due to acceleration of a first half of an expansion stroke of the present cylinder, and crankshaft acceleration that is due to acceleration of a second half of a compression stroke of a different cylinder, but it does not include a crankshaft acceleration that is due to a second half of an expansion stroke of a different cylinder because cylinder firing was skipped during crankshaft interval 510. Thus, the average total engine crankshaft acceleration for crankshaft angular 512 may be expressed as:

$$\ddot{\theta}_{Total} = \ddot{\theta}_{Load} + \ddot{\theta}_{E1} + \ddot{\theta}_{C2} \quad (1)$$

where $\ddot{\theta}_{Load}$ is the total average engine acceleration for the crankshaft interval 512, $\ddot{\theta}_{Load}$ is the engine load acceleration during crankshaft interval 512, $\ddot{\theta}_{E1}$ is the average crankshaft acceleration for the cylinder on its first half of its expansion stroke during crankshaft interval 512, and $\ddot{\theta}_{C2}$ is the average crankshaft acceleration for the cylinder on its second half of its compression stroke during crankshaft interval 512.

The crankshaft interval between crankshaft angles 90 and 180, which is identified as crankshaft angular interval 514 is a crankshaft interval where combustion in one engine cylinder undergoing its first half of the expansion stroke is requested or initiated via a spark plug. During this crankshaft interval, there may be crankshaft acceleration that is due to crankshaft acceleration during the first half of the expansion stroke of the cylinder in which combustion is requested or initiated. Therefore, misfire detection for the cylinder that is on its first half of its expansion stroke is performed. The average engine crankshaft acceleration during crankshaft interval 514 includes a crankshaft acceleration due to engine loads, crankshaft acceleration that is due to acceleration of a first half of an expansion stroke of the present cylinder, and crankshaft acceleration that is due to acceleration of a second half of an expansion stroke of the present cylinder, but it does not include a crankshaft acceleration that is due to a second half of a compression stroke of a different cylinder because cylinder firing after crankshaft interval 514 is skipped. Thus, the average total engine crankshaft acceleration for crankshaft angular interval 514 may be expressed as:

$$\ddot{\theta}_{Total} = \ddot{\theta}_{Load} + \ddot{\theta}_{E1} + \ddot{\theta}_{E2} \quad (2)$$

where $\ddot{\theta}_{Load}$ is the total average engine acceleration for the crankshaft interval 512, $\ddot{\theta}_{Load}$ is the engine load acceleration during crankshaft interval 514, $\ddot{\theta}_{E1}$ is the average crankshaft acceleration for the cylinder on its first half of its expansion stroke during crankshaft interval 514, and $\ddot{\theta}_{E2}$ is the average crankshaft acceleration for the cylinder on its second half of its expansion stroke during crankshaft interval 514.

Referring now to FIG. 6, two histograms illustrating some of the benefits of the present method and system are shown. The first histogram 600 includes a vertical axis that indicates the probability of an engine acceleration level for a particular engine speed and load condition. The horizontal axis indicates the average engine acceleration for a particular engine crankshaft interval (e.g., 90 crankshaft degrees for an eight cylinder engine). Histogram 600 shows the probabilities for engine crankshaft accelerations when crankshaft accelerations are not corrected according to the present method.

Slashed bars 602 represent engine acceleration levels when a misfire occurs in one cylinder of an engine that is operating with a ⅔ cylinder firing fraction. Bars 604 represent engine acceleration levels when no misfire occurs in an engine that is operating with the ⅔ cylinder firing fraction. The engine is operating at a same speed and load when the engine accelerations for bars 602 and 604 are generated. When bars 602 and bars 604 are shown overlapping, the engine acceleration values overlap. Thus, it may be observed that some misfiring cylinders may not be reliably distinguished from some firing cylinders because the engine crankshaft acceleration for misfiring cylinders is nearly the same as engine crankshaft acceleration for firing cylinders since crankshaft acceleration for firing cylinders may be affected by cylinders that skip firing.

The second histogram 650 includes the same vertical axis and horizontal axis that is shown in histogram 600. Therefore, for the sake of brevity the description of histogram 650 is not repeated. The engine acceleration values generated for determining the bars 602 and 604 are determined by operating the engine at the same speed and load as the engine was operated at to generate histogram 600.

Slashed bars 602 once again represent engine acceleration levels when a misfire occurs in one cylinder of an engine that is operating with a ⅔ cylinder firing fraction. Bars 604 once again represent engine acceleration levels when no misfire occurs in an engine that is operating with the ⅔ cylinder firing fraction. The engine is operating at a same speed and load when the engine accelerations for bars 602 and 604 are generated. However, the engine acceleration values determined for bars 602 and 604 are corrected according to the method of FIG. 7. Histogram 650 shows separation between bars 602 and 604. The separation indicates that by correcting the engine accelerations, it may be possible to reliably distinguish cylinder misfires from firing cylinders having acceleration that is affected by cylinders that skip firing. The greater the engine acceleration value separation between engine acceleration values for misfiring cylinders and engine acceleration for firing cylinders, the better possibility of distinguishing firing cylinder events from misfiring cylinder events.

Referring now to FIG. 7, a method for detecting cylinder misfire, mitigating cylinder misfire, and correcting engine acceleration is shown. The method of FIG. 7 may be incorporated into and may cooperate with the system of FIGS. 1-3B. Further, at least portions of the method of FIG. 7 may be incorporated as executable instructions stored in non-transitory memory while other portions of the method may be performed via a controller transforming operating states of devices and actuators in the physical world.

At 702, method 700 judges if mapping of engine crankshaft acceleration major components has been performed. Method 700 may judges that mapping of engine crankshaft acceleration has been performed based on a value of a variable stored on controller memory. For example, a value of a variable in controller memory may be set to a logical value of one if mapping of engine crankshaft acceleration has been performed. Otherwise, the value of the variable may be set to a logical value of zero. If method 700 judges that mapping of engine crankshaft acceleration has been performed, the answer is yes and method 700 proceeds to 710. Otherwise, the answer is no and method 700 proceeds to 704.

At 704, method 700 operates the engine at a predetermined firing fraction or density (e.g., a ratio of engine cylinders that fire in one or more engine cycles to the total number of cylinder compression strokes in the one or more engine cycles). In one example, method 700 may operate the engine with a firing fraction that allows determination of $\ddot{\theta}_{E1}$ (average engine crankshaft acceleration during a first half of an expansion stroke of a cylinder for a crankshaft interval), $\ddot{\theta}_{E2}$ (average engine crankshaft acceleration during a second half of an expansion stroke of a cylinder for a crankshaft interval), $\ddot{\theta}_{C2}$ (average engine crankshaft acceleration during a second half of a compression stroke of a cylinder for a crankshaft interval), and $\ddot{\theta}_{M1}$ (average engine crankshaft acceleration during a misfire in a first half of an expansion stroke of a cylinder for a crankshaft interval). In one example, these average engine crankshaft accelerations may be determined via operating the engine with a ⅔ firing fraction for an eight cylinder engine. In addition, the cylinders that make up the ⅔ firing fraction may be changed from engine cycle to engine cycle to enable determination of the above described average crankshaft acceleration values. However, for engines with different number of cylinders the engine may be engaged with a different firing fraction and a different choice of major crankshaft acceleration components over different crank angle intervals may be more appropriate. For example, the compression and expansion strokes may be split into three 60 crank angle degree portions on a 12 cylinder engine instead of two 90 crank angle degree portions with a crankshaft acceleration component assigned to each portion ($\ddot{\theta}_{E1}$, $\ddot{\theta}_{E2}$, $\ddot{\theta}_{E3}$, $\ddot{\theta}_{C2}$, $\ddot{\theta}_{C3}$). The corrected crankshaft acceleration may need to account for the impact of preceding two cylinders and following two cylinders. Other engines may require including acceleration components during portions of the intake and exhaust strokes (e.g. VDE engines with high-pressure trapping). The engine is also operated at a constant engine speed and load. Method 700 proceeds to 706.

At 706, method 700 determines engine speed and engine acceleration and solves a linear system equations for the different cylinder patterns in which the engine is operated. The average engine crankshaft acceleration due to load torque during a predetermined crankshaft interval (e.g., 90 crankshaft degrees for an eight cylinder engine) may be expressed according to the cylinder firing fraction or density $\alpha_{IR}$, $\ddot{\theta}_{C2}$ the average crankshaft acceleration for the cylinder on its second half of its compression stroke during the predetermined crankshaft interval, $\ddot{\theta}_{E1}$ the average crankshaft acceleration for the cylinder on its first half of its expansion stroke during predetermined crankshaft interval, and $\ddot{\theta}_{E2}$ the average crankshaft acceleration for the cylinder on its second half of its expansion stroke during the predetermined crankshaft interval via the following equation:

$$\ddot{\theta}_{Load} = -\alpha_{IR}(\ddot{\theta}_{C2} + \ddot{\theta}_{E1} + \ddot{\theta}_{E2}) \qquad (3).$$

The total engine crankshaft acceleration during the predetermined crankshaft interval in which combustion in engine cylinders is skipped (e.g., interval 510 shown in FIG. 5) may be expressed via the following equation:

$$\ddot{\theta}_{C2} + \ddot{\theta}_{E2} - \alpha_{IR}(\ddot{\theta}_{C2} + \ddot{\theta}_{E1} + \ddot{\theta}_{E2}) = (1-\alpha_{IR})\ddot{\theta}_{C2} - \alpha_{IR}\ddot{\theta}_{E1} + (1-\alpha_{IR})\ddot{\theta}_{E2} = \ddot{\theta}_t \qquad (4)$$

where $\ddot{\theta}_t$ is the measured total engine crankshaft acceleration during the predetermined crankshaft angular interval and $\ddot{\theta}_{C2}$, $\ddot{\theta}_{E2}$, and $\ddot{\theta}_{E1}$ are three unknowns that are solved.

The total engine crankshaft acceleration during the predetermined crankshaft interval in which combustion in an engine cylinder is initiated (e.g., spark is delivered to the cylinder), combustion in a cylinder that is immediately prior to the cylinder in an order of combustion is skipped, and combustion in a cylinder that is immediately after the cylinder in an order of combustion is initiated (e.g., interval 512 shown in FIG. 5) may be expressed via the following equation:

$$\ddot{\theta}_{C2}+\ddot{\theta}_{E1}-\alpha_{IR}(\ddot{\theta}_{C2}+\ddot{\theta}_{E1}+\ddot{\theta}_{E2})=(1-\alpha_{IR})\ddot{\theta}_{C2}-\alpha_{IR}\ddot{\theta}_{E2}+(1-\alpha_{IR})\ddot{\theta}_{E1}=\ddot{\theta}_j \quad (5)$$

where $\ddot{\theta}_j$ is the measured total engine crankshaft acceleration during the predetermined crankshaft angular interval and $\ddot{\theta}_{C2}$, $\ddot{\theta}_{E2}$, and $\ddot{\theta}_{E1}$ are three unknowns that are solved.

The total engine crankshaft acceleration during the predetermined crankshaft interval in which combustion in an engine cylinder is initiated, combustion in a cylinder that is immediately prior to the cylinder in an order of combustion is initiated, and combustion in a cylinder that is immediately after the cylinder in an order of combustion is skipped (e.g., interval 514 shown in FIG. 5) may be expressed via the following equation:

$$\ddot{\theta}_{E1}+\ddot{\theta}_{E2}-\alpha_{IR}(\ddot{\theta}_{C2}+\ddot{\theta}_{E1}+\ddot{\theta}_{E2})=-\alpha_{IR}\ddot{\theta}_{C2}+(1-\alpha_{IR})\ddot{\theta}_{E2}+(1-\alpha_{IR})\ddot{\theta}_{E1}=\ddot{\theta}_k \quad (6)$$

where $\ddot{\theta}_k$ is the measured total engine crankshaft acceleration during the predetermined crankshaft angular interval and $\ddot{\theta}_{C2}$, $\ddot{\theta}_{E2}$, and $\ddot{\theta}_{E1}$ are three unknowns that are solved.

The above equations may also be solved for conditions when a misfire is induced in the cylinder that is scheduled to initiate combustion of air and fuel in the predetermined crankshaft interval. During such conditions, the above equations may be modified by adding $\ddot{\theta}_{M1}-\ddot{\theta}_{E1}$ to the left hand side of the equations 5 and 6. The system of equations 4-6 is solved for $\ddot{\theta}_{C2}$, $\ddot{\theta}_{E2}$, and $\ddot{\theta}_{E1}$. In one example, the system of equations may be represented via matrices A, X, and B, where A is a coefficient matrix, B is a matrix of $\ddot{\theta}_i$, $\ddot{\theta}_j$, $\ddot{\theta}_k$, and the X matrix includes $\ddot{\theta}_{C2}$, $\ddot{\theta}_{E2}$, and $\ddot{\theta}_{E1}$. Equations 4-6 may be expressed at A·X=B, which may be solved for X by $\hat{X}=(A^TA)^{-1}A^T\cdot B$ since $\ddot{\theta}_i$, $\ddot{\theta}_j$, and $\ddot{\theta}_k$ are measured. The solutions for $\ddot{\theta}_{C2}$, $\ddot{\theta}_{E2}$, $\ddot{\theta}_{E1}$, and $\ddot{\theta}_{M1}$ are denoted by $\widehat{\ddot{\theta}_{C2}}$, $\widehat{\ddot{\theta}_{E2}}$, $\widehat{\ddot{\theta}_{E1}}$, and $\widehat{\ddot{\theta}_{M1}}$ may be stored in controller non-transitory memory and associated with memory locations that are unique for cylinder firing patterns. Method 700 proceeds to 708.

At 708, method 700 judges if engine accelerations for all desired engine speeds and cylinder loads have been decomposed into their individual engine acceleration components (e.g., $\ddot{\theta}_{C2}$, $\ddot{\theta}_{E2}$ and $\ddot{\theta}_{E1}$). If so, the answer is yes and method 700 proceeds to 710. Otherwise, the answer is no and method 700 proceeds to 740.

At 740, the engine speed and/or cylinder load may be adjusted so that individual engine acceleration components may be determined for a plurality of engine speeds and cylinder loads. For example, if the individual acceleration components for an engine speed of 1500 RPM and 0.3 cylinder load were newly determined, then the cylinder load may be increased to 0.4 so that individual engine acceleration components may be determined for 1500 RPM and 0.4 load. Method 700 returns to 706 after engine speed and/or cylinder load is adjusted. It should be noted that steps 702, 704, 706, 708, and 740 may be performed off-line during an engine calibration process.

At 710, method 700 judges if conditions are present for evaluating the engine for misfire. In one example, the engine may be evaluated for misfire when the engine is combusting air and fuel. Further, other conditions may be required before the engine may be evaluated for misfire. For example, engine temperature may have to be greater than a threshold temperature. If method 700 judges that the engine is not to be evaluated for misfire, the answer is no and method 700 proceeds to exit. If method 700 judges that the engine is to be evaluated for misfire, the answer is yes and method 700 proceeds to 712.

When method 700 proceeds to 712, the engine may be operated with all engine cylinders combusting air and fuel during each engine cycle or the engine may be operated with only a fraction of the cylinders combusting air and fuel each engine cycle. Further, the cylinders that are activated and deactivated may change from engine cycle to engine cycle.

At 712, method 700 selects or determines an engine cylinder that is to be evaluated for misfire based on the engine's crankshaft position. In one example, method 700 selects the engine cylinder that is presently on its first half of its expansion stroke to be evaluated for misfire. The engine's crankshaft position may be divided into sections over two engine revolutions for a four stroke engine as shown in FIGS. 4 and 5 to resolve which cylinder is selected to be evaluated for misfire. Method 700 proceeds to 714.

At 714, method 700 determines engine crankshaft acceleration for the present crankshaft interval via the engine position sensor (e.g., a 90 crankshaft degree interval for an eight cylinder engine). The engine crankshaft acceleration may be determined from the distance that the engine crankshaft rotates in a predetermined amount of time. Method 700 proceeds to 716.

At 716, method 700 determines the corrected engine crankshaft acceleration for the selected predetermined engine crankshaft angular interval. The engine crankshaft acceleration is associated with the engine's present speed, load, cylinder firing fraction, and operating states of cylinders in the engine firing order that are immediately before and after the selected engine cylinder. The corrected engine crankshaft acceleration for the selected predetermined engine crankshaft angular interval may be determined via the following equation:

$$\ddot{\theta}_{Corr}=\ddot{\theta}+\widehat{\ddot{\theta}_{Ref}}-\ddot{\ddot{\theta}} \quad (7)$$

where $\ddot{\theta}_{Corr}$ is the corrected engine crankshaft acceleration for the selected engine crankshaft angular interval, $\ddot{\theta}$ is the measured average engine crankshaft acceleration for the present crankshaft interval, $\widehat{\ddot{\theta}_{Ref}}$ is the estimated average engine crankshaft acceleration at the current engine speed, cylinder load, and the selected engine crankshaft angular interval corresponding to some chosen reference states for the previous and following cylinders (e.g., both previous and following cylinders are fired) and some chosen reference engine firing density (e.g., engine firing density of 1), and $\ddot{\ddot{\theta}}$ is the estimated average engine crankshaft acceleration at the present engine speed, cylinder load, and crankshaft angular interval corresponding to the present reference states for the previous and following cylinders and present engine firing density. The estimated engine crankshaft acceleration at the chosen reference conditions (reference states of previous and following cylinders and reference firing density) may be expressed (for an eight cylinder engine) using the estimated crankshaft acceleration components (determined at step 706) as:

$$\widehat{\ddot{\theta}_{Ref}}=s_{+1,Ref}\widehat{\ddot{\theta}_{C2}}+\ddot{\theta}_{E1}+s_{-1,Ref}\widehat{\ddot{\theta}_{E2}}-\alpha_{IR,Ref}(\widehat{\ddot{\theta}_{C2}}+\widehat{\ddot{\theta}_{E1}}+\widehat{\ddot{\theta}_{E2}}) \quad (8)$$

where $s_{+1,Ref}$ is the chosen reference following cylinder state (e.g., 1 if firing and 0 if skipped), $s_{-1,Ref}$ is the chosen reference previous cylinder state (e.g., 1 if firing 0 if skipped or misfired), and $\alpha_{IR,Ref}$ is the chosen reference firing density.

The estimated average engine crankshaft acceleration $\ddot{\theta}$ for the present engine speed, engine load, and crankshaft angular interval at the present conditions (present states of previous and following cylinders and present firing density) may be expressed (for an eight cylinder engine) using the estimated crankshaft acceleration components (determined at step 706) as:

$$\ddot{\theta} = s_{+1}\widehat{\theta_{C2}} + s_0 \widehat{\theta_{C2}} + s_{-1}\widehat{\theta_{E2}} - \alpha_{IR}(\widehat{\theta_{C2}} + \widehat{\theta_{C2}} + \widehat{\theta_{E2}}) \quad (9)$$

where $s_{+1}$ is the following cylinder state (e.g., 1 if firing and 0 if skipped) relative to the cylinder being evaluated for misfire, $s_{-1}$ is the previous cylinder state (e.g., 1 if firing 0 if skipped or misfired) relative to the cylinder being evaluated for misfire, $s_0$ is the state of the present cylinder being evaluated for misfire, and $\alpha_{IR}$ is the current firing density. The corrected average engine acceleration for the present engine crankshaft interval may be expressed (for an eight cylinder engine) as:

$$\ddot{\theta}_{Corr} = \ddot{\theta} + (s_{+1,Ref} - s_{+1} + \alpha_{IR} - \alpha_{IR,Ref})\widehat{\theta_{C2}} + (-s_0 + \alpha_{IR} - \alpha_{IR,Ref})\widehat{\theta_{C2}} + (s_{-1,Ref} - s_{-1} + \alpha_{IR} - \alpha_{IR,Ref})\widehat{\theta_{E2}} \quad (10)$$

where $\widehat{\theta_{C2}}$, $\widehat{\theta_{E2}}$, and $\widehat{\theta_{E1}}$ correspond to the average engine accelerations determined at engine speed and engine load in step 706 that are equivalent to the present engine speed and cylinder load. By including $\alpha_{IR}$, compensation is provided for cylinder firing fraction or density.

Equations 8, 9 and 10 apply to any chosen reference $\alpha_{IR}$, $s_{+1}$ and $s_{-1}$. The histograms in FIG. 6 correspond to a corrected acceleration where the reference $\alpha_{IR}$ was chosen to be 1 (i.e. reference $s_{+1}$ and $s_{-1}$ are also 1).

The choice of the reference condition: $\alpha_{IR}$, $s_{+1}$ and $s_{-1}$ can be arbitrary as long as the same reference conditions are always chosen. The actual measured acceleration $\ddot{\theta}$ can have a large scatter due variation in the present conditions $\alpha_{IR}$, $s_{+1}$ and $s_{-1}$ from cycle to cycle. The corrected accelerations are estimates of what the measured accelerations would have been if the conditions $\alpha_{IR}$, $s_{+1}$ and $s_{-1}$ were instead at some fixed reference value. This way the scatter due variation in the present conditions $\alpha_{IR}$, $s_{+1}$ and $s_{-1}$ from cycle to cycle is eliminated regardless of what reference condition is chosen as long as the same reference condition is used all the time. To obtain the corrected acceleration value, we have to add the difference between our estimate of the acceleration at reference $\alpha_{IR}$, $s_{+1}$ and $s_{-1}$ and the out estimate of acceleration at the present $\alpha_{IR}$, $s_{+1}$ and $s_{-1}$. These estimates are based on $\widehat{\theta_{C2}}$, $\widehat{\theta_{E2}}$, and $\widehat{\theta_{E1}}$ from step 706.

While any choice of reference condition $\alpha_{IR}$, $s_{+1}$ and $s_{-1}$ would work, a choice of reference $\alpha_{IR}=1$ (i.e. reference $s_{+1}$ and $s_{-1}$ are also 1) is the equivalent of estimating what the measured acceleration would have been if this engine was not operating in VDE mode.

For an engine where the number of cylinders is not 8, it may be convenient to choose the major acceleration components different than an average crankshaft acceleration in a second portion of a compression stroke of a cylinder, an average crankshaft acceleration in a first portion of an expansion stroke of the cylinder, and an average crankshaft acceleration in a second portion of the expansion stroke of the cylinder, and where the state of cylinders other than the preceding and following cylinder may affect the current cylinder acceleration. Method 700 proceeds to 718.

At 718, method 700 determines if the corrected average engine acceleration for the selected predetermined engine crankshaft angular interval is less than (L.T.) a threshold engine acceleration. If so, the answer is yes and method 700 proceeds to 720. Otherwise, the answer is no and method 700 proceeds to 730.

At 730, method 700 selects the cylinder that is next in the firing order of the engine for cylinder misfire evaluation. Method 700 returns to 714.

At 720, method 700 indicates cylinder misfire for the engine cylinder that is in its first half of its expansion stroke during the selected predetermined engine crankshaft angular interval. The indication may be provided to a human that occupies the vehicle and the indication may be provided via a human/machine interface. Further, method 700 may attempt to reduce the possibility of additional misfires in the engine via increasing an amount of energy that is delivered to cylinder spark plugs. The amount of energy that is delivered to a spark plug may be increased via increasing a dwell time that an ignition coil is charged. In addition, method 700 may also enrichen an air-fuel ratio of the engine cylinders, adjust cylinder spark timing, and/or adjust an amount of exhaust gas recirculation to reduce the possibility of cylinder misfires. Method 700 proceeds to 730 after adjusting engine operation to reduce the possibility of cylinder misfires.

In this way, engine crankshaft acceleration may be corrected to compensate for changes in engine acceleration that may be due to deactivating one or more engine cylinders. The corrected engine crankshaft acceleration may then be used as a basis for determining the presence or absence of cylinder misfire. If misfire is determined, mitigating actions may be taken to reduce the possibility of additional cylinder misfires.

Thus, the method of FIG. 7 provides for a method for operating an engine, comprising: operating a variable displacement engine; correcting a crankshaft acceleration via a controller responsive to at least two of an average crankshaft acceleration in a portion of a first stroke of a cylinder, an average crankshaft acceleration in a first portion of a second stroke of the cylinder, and an average crankshaft acceleration in a second portion of the second stroke of the cylinder; and adjusting engine operation responsive to a misfire detected via the controller, the misfire detected via the corrected crankshaft acceleration. The method includes where adjusting engine operation includes adjusting an amount of spark energy, where the first stroke is a compression stroke, and where the second stroke is an expansion stroke. The method includes where adjusting engine operation includes adjusting spark timing. The method includes where adjusting engine operation includes adjusting an air-fuel ratio of the cylinder. The method includes where adjusting the air-fuel ratio includes richening the air-fuel ratio. The method includes where correcting the crankshaft acceleration for the first portion of the expansion stroke of the cylinder includes compensating for engine firing density. The method includes where correcting the crankshaft acceleration for the first portion of the expansion stroke for the cylinder is performed when one or more of the variable displace engine cylinders is deactivated.

The method of FIG. 7 provides for a method for operating an engine, comprising: assessing a presence or absence of cylinder misfire via a controller based on a plurality of average crankshaft accelerations, each of the plurality of average crankshaft accelerations stored in controller memory and associated with a unique cylinder firing pattern; and adjusting engine operation responsive to the presence of cylinder misfire. The method further comprises determining the plurality of average crankshaft accelerations via solving a plurality of equations. The method further comprises correcting a present average crankshaft acceleration for a cylinder based on the plurality of average crankshaft accelerations. The method further comprises comparing the present average crankshaft acceleration for the cylinder to a threshold acceleration. The method further comprises indicating cylinder misfire in response to the present corrected average crankshaft acceleration for the cylinder being less than the threshold acceleration. The method includes where adjusting engine operation includes richening an air-fuel mixture. The method includes where adjusting engine operation includes increasing spark energy delivered to the cylinder. The method includes where adjusting engine operation includes adjusting spark timing of the cylinder.

In another representation, method of FIG. 7 provides for a method for operating an engine, comprising: operating a variable displacement engine with fewer than all of its cylinders being activated; correcting a crankshaft acceleration for a first cylinder during a predetermined crankshaft interval via a controller responsive to an average crankshaft acceleration in a portion of a stroke of a second cylinder and an average crankshaft acceleration in a portion of a stroke of a third cylinder. The method includes where the second cylinder skips combustion in the portion of the stroke of the second cylinder. The method includes where the third cylinder skips combustion in the portion of the stroke of the third cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
   operating a variable displacement engine;
      correcting a crankshaft acceleration via a controller responsive to at least two of an average crankshaft acceleration in a portion of a first stroke of a cylinder, an average crankshaft acceleration in a first portion of a second stroke of the cylinder, and an average crankshaft acceleration in a second portion of the second stroke of the cylinder; and
      adjusting an engine operation responsive to a misfire detected via the controller, the misfire detected via the corrected crankshaft acceleration,
      where adjusting the engine operation includes adjusting an amount of spark energy, the first stroke is a compression stroke, and the second stroke is an expansion stroke.

2. The method of claim 1, where adjusting the engine operation includes adjusting a spark timing.

3. The method of claim 1, where adjusting the engine operation includes adjusting an air-fuel ratio of the cylinder.

4. The method of claim 3, where adjusting the air-fuel ratio includes richening the air-fuel ratio.

5. A method for operating an engine, comprising:
   operating a variable displacement engine;
   correcting a crankshaft acceleration via a controller responsive to at least two of an average crankshaft acceleration in a portion of a first stroke of a cylinder, an average crankshaft acceleration in a first portion of a second stroke of the cylinder, and an average crankshaft acceleration in a second portion of the second stroke of the cylinder; and
   adjusting an engine operation responsive to a misfire detected via the controller, the misfire detected via the corrected crankshaft acceleration, where correcting the crankshaft acceleration for the first portion of the second stroke of the cylinder includes compensating for an engine firing density.

6. The method of claim 5, where adjusting the engine operation includes adjusting a spark timing.

7. The method of claim 5, where adjusting the engine operation includes adjusting an air-fuel ratio of the cylinder.

8. A method for operating an engine, comprising:
   operating a variable displacement engine;
   correcting a crankshaft acceleration via a controller responsive to at least two of an average crankshaft acceleration in a portion of a first stroke of a cylinder, an average crankshaft acceleration in a first portion of a second stroke of the cylinder, and an average crankshaft acceleration in a second portion of the second stroke of the cylinder; and
   adjusting an engine operation responsive to a misfire detected via the controller, the misfire detected via the corrected crankshaft acceleration, where correcting the crankshaft acceleration for the first portion of the second stroke for the cylinder is performed when one or more of the cylinders is deactivated.

9. The method of claim 8, where adjusting the engine operation includes adjusting a spark timing.

10. The method of claim 8, where adjusting the engine operation includes adjusting an air-fuel ratio of the cylinder.

11. A system for operating an engine, comprising:
a variable displacement engine; and
a controller including executable instructions stored in a non-transitory memory to operate the variable displacement engine and adjust an engine operation responsive to a corrected crankshaft acceleration that is based on at least two of an average crankshaft acceleration in a portion of a compression stroke of a cylinder, an average crankshaft acceleration in a first portion of an expansion stroke of the cylinder, and an average crankshaft acceleration in a second portion of the expansion stroke of the cylinder.

12. The system of claim 11, further comprising additional instructions to operate the variable displacement engine with fewer than all of its cylinders during an engine cycle while determining the corrected crankshaft acceleration.

13. The system of claim 11, where the average crankshaft acceleration in the portion of the compression stroke of the cylinder, the average crankshaft acceleration in the first portion of the expansion stroke of the cylinder, and the average crankshaft acceleration in the second portion of the expansion stroke of the cylinder are stored in controller memory.

14. The system of claim 11, where adjusting the engine operation includes adjusting engine spark timing.

15. The system of claim 11, where adjusting the engine operation includes adjusting an engine air-fuel ratio.

* * * * *